US012583153B2

(12) United States Patent
Schroeder et al.

(10) Patent No.: US 12,583,153 B2
(45) Date of Patent: Mar. 24, 2026

(54) METHOD FOR OVERMOLDING A TUBULAR STRUCTURE

(71) Applicant: ENTEGRIS, INC., Billerica, MA (US)

(72) Inventors: David Schroeder, Bloomington, MN (US); Michael A. Thompson, St. Peter, MN (US); Alain Crosfield, Apple Valley, MN (US); Douglas Wenell, North Branch, MN (US)

(73) Assignee: ENTEGRIS, INC., Billerica, MA (US)

( * ) Notice: Subject to any disclaimer, the term of this patent is extended or adjusted under 35 U.S.C. 154(b) by 279 days.

(21) Appl. No.: 18/128,420

(22) Filed: Mar. 30, 2023

(65) Prior Publication Data

US 2023/0311380 A1      Oct. 5, 2023

Related U.S. Application Data

(60) Provisional application No. 63/326,062, filed on Mar. 31, 2022.

(51) Int. Cl.
B29C 45/14          (2006.01)
(52) U.S. Cl.
CPC .. B29C 45/14065 (2013.01); B29C 45/14622 (2013.01); *B29C 2045/14139* (2013.01)
(58) Field of Classification Search
CPC ........ B29C 45/14614; B29C 45/14549; B29C 45/14065; B29C 45/14622; B29C 45/14139
See application file for complete search history.

(56) References Cited

U.S. PATENT DOCUMENTS

| | | | | |
|---|---|---|---|---|
| 4,670,009 | A * | 6/1987 | Bullock ................ | A61M 25/00 604/533 |
| 4,786,031 | A | 11/1988 | Waldrop | |
| 4,815,769 | A * | 3/1989 | Hopperdietzel ......... | H05B 3/58 285/47 |
| 4,997,213 | A * | 3/1991 | Traner .................... | F16L 31/02 285/915 |
| 5,302,336 | A * | 4/1994 | Hartel .............. | B29C 45/14614 264/263 |
| 5,356,587 | A * | 10/1994 | Mitsui ................. | B29C 45/2669 425/149 |

(Continued)

FOREIGN PATENT DOCUMENTS

| | | | |
|---|---|---|---|
| DE | 102007011041 | * | 9/2008 |
| EP | 3804944 A1 | | 4/2021 |

(Continued)

*Primary Examiner* — Edmund H Lee

(57)          ABSTRACT

A method for overmolding a tubular structure including inserting a core pin into the tubular structure so that at least a portion of a main body of the core pin extends at least partially out of the tubular structure. The method further includes clamping the tubular structure to a mold cavity structure in an Z-direction using a retaining structure, in which the retaining structure includes an inclined portion and the flexible portion extends out of the mold cavity structure. The method also includes injecting a thermoplastic material into a mold cavity of the mold cavity structure to overmold at least a portion of the tubular structure, in which the injecting of the thermoplastic material includes the thermoplastic material contacting the portion of the core pin extended from the tubular structure.

12 Claims, 10 Drawing Sheets

(56) References Cited

U.S. PATENT DOCUMENTS

| | | | | |
|---|---|---|---|---|
| 5,895,695 A * | 4/1999 | Rowley | ................. | B29C 70/766 |
| | | | | 428/36.1 |
| 6,635,214 B2 * | 10/2003 | Rapacki | ............ | B29C 45/14598 |
| | | | | 264/250 |
| 7,708,923 B1 * | 5/2010 | Helicke | ............ | B29C 45/14598 |
| | | | | 264/261 |
| 8,343,407 B1 * | 1/2013 | Seman, Sr. | ....... | B29C 45/14336 |
| | | | | 264/275 |
| 8,424,923 B2 * | 4/2013 | Inman, Jr. | .......... | B29C 66/1282 |
| | | | | 285/285.1 |
| 2003/0069612 A1 | 4/2003 | Zart | | |
| 2010/0270702 A1 | 10/2010 | Zelkovich | | |
| 2019/0255282 A1 | 8/2019 | Inukai | | |
| 2021/0086417 A1 | 3/2021 | Mühlemann | | |

FOREIGN PATENT DOCUMENTS

| | | | |
|---|---|---|---|
| JP | H04174663 A | | 6/1992 |
| JP | H0596629 A | | 4/1993 |
| JP | H0866929 A | | 3/1996 |
| JP | 2004170671 A | | 6/2004 |
| JP | 2010194746 A | | 9/2010 |
| JP | 2011224132 A | | 11/2011 |
| JP | 2013220533 A | | 10/2013 |
| JP | 2016141007 A | | 8/2016 |
| JP | 2018534066 A | | 11/2018 |
| JP | 2019025830 A | | 2/2019 |
| WO | WO2005102005 | * | 11/2005 |
| WO | 2013016521 A1 | | 1/2013 |
| WO | 2015031207 A1 | | 3/2015 |

* cited by examiner

METHOD FOR OVERMOLDING A TUBULAR STRUCTURE

FIELD

This disclosure relates to methods for forming overmolded flexible substrate components over tubular structures and overmolded tubular structures. More specifically, the disclosure relates to a method for injection molding overmolded components using an overmolding specialty tooling and a tubular structure with an overmolded component that is injection molded. The overmolded component can be a sheath for a catheter or stent or a connector that is part of a connection assembly for transferring fluids, such as from chemical and/or biological processes, through a number of different tubing, couplings, and/or storage containers.

BACKGROUND

Methods and apparatuses for injection molding an object are well known. For example, a mold cavity having the shape of the desired object is created in at least two parts, and a liquefied material is injected into the mold cavity. Then, the liquefied material is allowed to solidify and the final molded object is removed from the mold.

In some instances, the molded object is a tubular structure that needs a hollow portion, for example, to form tubing, pipes, connectors for tubing and pipes, or other similar tubular structure, in which the traditional tooling methods use core pins with supporting features to hold the core pins in place during the injection molding process. In such cases, the solid core pins typically require some type of locking mechanism that abuts against a back end of the core pins to provide a resistance force against the high pressure provided during the injection of the liquefied material to maintain the positioning of the core pins. The maintaining of the core pins helps to reduce/eliminate flash, e.g., prevent the liquefied material from entering or forming in the hollow portion of the molded object at the intersection of the core pins. By reducing or eliminating flash, interruptions in the flow path in the tubular structure and/or defects in the molded component that can lead to failure, e.g., leakages, breakages, or rupture, can be avoided. In other prior art injection molding processes, threaded core pins are used, but since the core pins are not retained, flashing can occur between the tubular structure and the core pins.

Furthermore, since some prior injection molding methods use core pins that are solid mandrels, e.g., solid metal portions, that have long lengths, for example, mandrels that can be as long as 36", the core pins extend out of the mold die such that the injection molding of a tubular structure requires a large press size. Additionally, due to the lengths of the solid mandrel core pins, the core pins are difficult to manage and result in a complicated process for the interchanging of core pins for overmolding different lengths of the tubular structures. Moreover, in view of the long lengths of the core pins, the core pins are difficult to remove from the tubular structure and can thus, result in damage to the tubular structure when attempting to remove the core pins.

That is, there is a problem in prior injection molding processes in forming a tubular structure with overmolded components, in which the prior molding apparatuses/dies do not adequately reduce or prevent flashing of the liquefied material, and also require the use of overmolding tooling that is difficult to manage since the overmolding tooling has a large footprint size and use long core pins of solid core material that are difficult to manage, remove, and/or extract.

SUMMARY

In an embodiment, a method for overmolding a tubular structure is provided. The method includes the step of overmolding a polymeric connector onto two or more polymeric tubular structures each having an internal core pin by preloading a force onto the two or more tubular structures to secure the internal core pins from moving therein in a first mold cavity while joining a second mold cavity and injection molding the connector.

In another embodiment, a method for overmolding a tubular structure includes inserting a core pin into the tubular structure so that at least a portion of a main body of the core pin extends at least partially out of the tubular structure, in which the core pin includes the main body and a flexible portion connected to the main body and the flexible portion extends out of the tubular structure. The method further includes clamping the tubular structure to a mold cavity structure in an Z-direction and/or the containment direction using a retaining structure, in which the retaining structure includes an inclined portion and the flexible portion extends out of the mold cavity structure. The method also includes injecting a thermoplastic material into a mold cavity of the mold cavity structure to overmold at least a portion of the tubular structure, in which the injecting of the thermoplastic material includes the thermoplastic material contacting the portion of the core pin extended from the tubular structure.

The details of one or more embodiments of the disclosure are set forth in the accompanying drawings and the description, and from the claims.

BRIEF DESCRIPTION OF DRAWINGS

References are made to the accompanying drawings that form a part of this disclosure, and which illustrate embodiments in which the systems and methods described in this specification can be practiced.

Like numbers represent like features.

DETAILED DESCRIPTION

This application is related to U.S. application No. 62/274,357 titled overmolded Tubing Connectors, which is herein incorporated by reference in its entirety.

This disclosure relates to methods for forming overmolded flexible substrate components over tubular structures and overmolded tubular structures. More specifically, the disclosure relates to a method for injection molding overmolded components using an overmolding specialty tooling and a tubular structure with an overmolded component that is injection molded. The overmolded component can be a connector that is part of a connection assembly for transferring fluids, such as from chemical and/or biological processes, through a number of different tubing, couplings, and/or storage containers. While the particular injection molding method for forming the tubular structure with the overmolded component being a connector is discussed below for a fluid connection assembly, it is appreciated that such discussion is not intended to limit the scope of the disclosure, but is provided as embodiments thereof. For example, in an embodiment, the injection molding method can also be used for forming a catheter, a stent, a connection for tubing for other fluid assemblies, or other tubular structure that has a hollow core portion with an overmolded component for transferring fluids.

Figure 1:
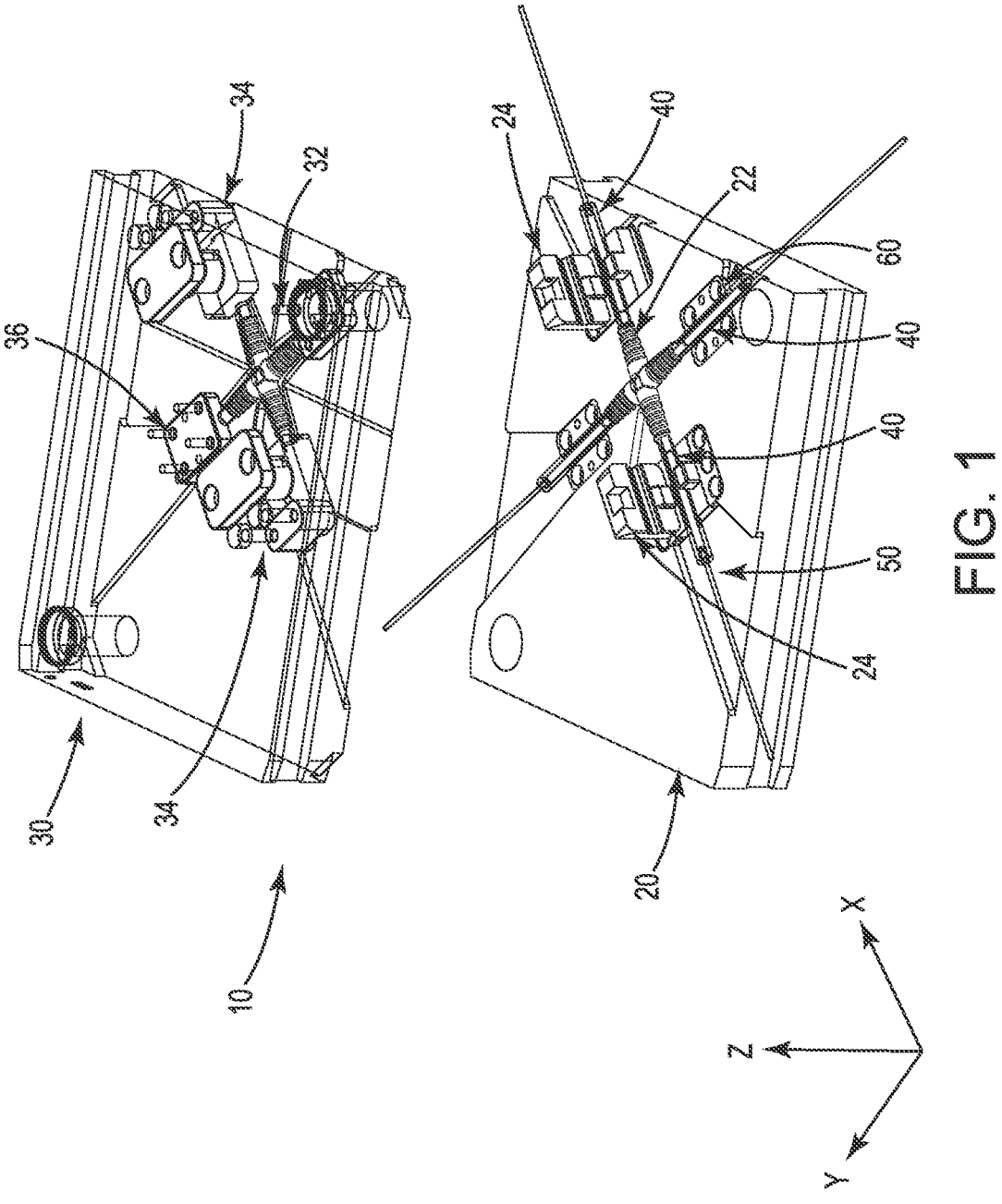
FIG. 1 is a perspective view of a specialty molding tooling according to an embodiment.
Figure 2:
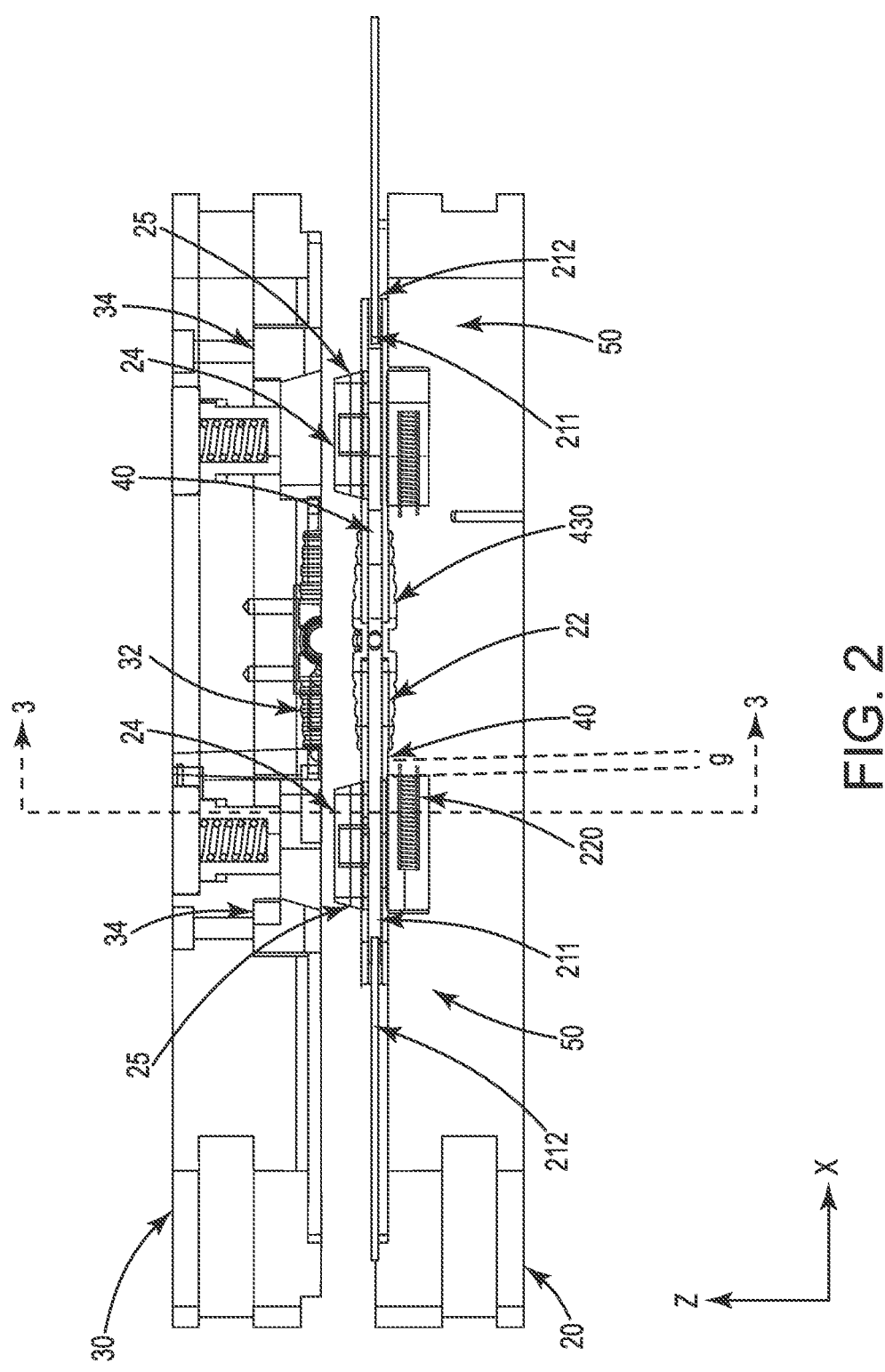
FIG. 2 is a cross-sectional view of the specialty molding tooling in FIG. 1 prior to connecting the top half and the bottom half of the molding apparatus.

FIGS. 1 and 2 illustrate an example embodiment of an overmolding specialty tooling apparatus for providing a tubular structure with an overmolded component that has a hollow portion, for example, to form tubing, pipes, connectors for tubing and pipes, catheters, stents, or other similar tubular structures that can be used to transfer a fluid. In an embodiment, the injection molding process includes injecting a liquefied polymeric material for overmolding at least one tubular structure, but preferably for forming an overmolded connector for two or more tubular structures. The injection molding process includes using a specialty tooled molding apparatus 10 that includes a bottom half 20 and a top half 30, in which the bottom half 20 and the top half 30 have complementary structures for the injection molding. It is appreciated that when the bottom half 20 and top half 30 are connected or engaged, a sealed mold cavity is formed for receiving the injected liquefied polymeric material to form the overmolded component or portion over the tubular structure(s).

The bottom half 20 of the molding apparatus 10 includes a bottom half mold cavity 22 for receiving at least one tubular structure 40 and core pin 50. The bottom half mold cavity 22 includes one half of a predetermined shape for forming the overmolded component or portion over the tubular structure 40 and core pin 50. The bottom half 20 further includes at least one retaining structure 24 for clamping and/or retaining the positioning of the tubular structure 40 to prevent movement of the tubular structure 40 during the injection molding process. It is appreciated that while FIGS. 1 and 2 illustrate the use of two retaining structures 24, the number of retaining structures 24 can be varied depending on the number of tubular structures and/or whether a preloaded force is necessary for the overmolding of the tubular structure(s), as discussed further below. The bottom half 20 of the molding apparatus 10 can also include additional structures, such as, guide sleeves, a cooling system, guide pins/plates, or the like, the disclosures of which are not necessary for the understanding of the present overmolding method.

The top half 30 of the molding apparatus 10 includes a top half mold cavity 32 having the complementary half of the predetermined shape for forming the overmolded component or portion over the tubular structure 40 and core pin 50, abutment structures 34 that have complementary geometries for engaging with the retaining structure 24, e.g., oppositely inclined surfaces, and clamping portions 36 for clamping or retaining tubular structure(s), e.g., configured to hold or retain the tubular structures 40 during the injection molding process in at least the Z-direction and/or the containment direction. The top half 30 of the molding apparatus 10 can also include additional structures, such as, die springs, a cooling system, guide pins or pillars, ejector pins/plates, locating rings, thermoplastic inlet port, or the like.

The predetermined shape of the mold cavity can be any shape for forming the overmolded component or portion over the tubular structure and core pin that is prefabricated in the mold die or is provided as an insert that is inserted into the molding apparatus 10. For example, the shape can be for producing an overmolded component for a catheter, dilators, fasteners, needles, connectors, luers, hubs, cannulas, etc. In an embodiment, the overmolded portion can have a shape for forming a sheath or balloon over the tubing to form a catheter or for forming a sheathing over the cannula(s) for a stent.

In an embodiment, the predetermined shape is for a connector for a fluid connection system, in which the connector has at least two connector portions. The at least two connector portions extend from a center of the connector and have a first end connected to the center of the connector and a second end connected to the second open end of one of the plurality of tubes, and in which each of the at least two connector portions are formed to be conically tapered where an outer diameter of the first end at the center of the connector is larger than an outer diameter of the second end of the connector portion in a way such that the connector portion is flexible. The connector portions are continuously formed with the tubular structure so that an internal flow path is continuously formed between the connector portions and the tubular structure(s). Since the overmolded component is overmolded on the tubular structure, the internal flow paths of the connector portions are complementary in configuration with the outer surface of the tubular structures such that the tubular structures are able to be at least partly disposed within the connector portion(s). Thus, the connector portions of the connector are fluidly connected to each other and the plurality of tubular structures through the center of the connector. It is appreciated that while in this embodiment, the connector has an internal flow path that has an inner diameter that is equal to or similar to an inner diameter of the tubular structure, the connector can also have an internal flow path that has a larger or smaller inner diameter than the inner diameter of the tube depending on the requirements for transferring a pharmaceutical or biological fluid. That is, the sizing of at least the inner diameter of the connector and/or the tubular structure is volume dependent, e.g., the connecter can be sized to be used as a reducer, expander, or combination thereof.

The connector can be provided with strain relief portions to further increase the flexibility of the connector. For example, each connector portion can include a plurality of rib sections that are provided along the outer surface of the conically tapered connector portion. The plurality of rib sections is provided in parallel arrangement along a length direction of the connector portion, in which the rib section provided closest or nearest the center of the connector has an outer diameter that is larger than a rib section provided at a second end of the connector portion. By having such a structure, the connector portions of the connector are able to be further articulated, e.g., moved, so that when a tubular structure is moved or adjusted, the connector portion is articulated and/or bent so that the tubular structure is not stressed which prevents the formation of restrictions in the flow path. That is, since kinks in the tubular structure and/or the pinching or buckling of the tubular structure are not created, the flow transition between the connector and tubular structure is maintained, e.g., maintains a smooth flow curvature along the flow path.

It is appreciated that the connector can have different configurations, for example, the connector can have four connector portions provided as a four-arm cross design, or the connector can include a plurality of connector portions arranged as any combination of a four-arm cross mold design, a six-arm cross mold design (or star mold design), a tee-mold design, a y-mold design, an elbow mold design, or combination thereof. The connector design configuration can be chosen based on the number of bag assemblies required to be filled, layouts of the bag assemblies or processing equipment, or other design consideration. For example, the connector can be configured as a reducer, expander, or combination thereof when needed to connect different size tubing or components.

The retaining structure 24 can be any device that provides a clamping or retaining force in at least the Z-direction and/or a containment direction, e.g., perpendicular and/or horizontal to the molding apparatus 10, for clamping and/or retaining the positioning of the tubular structure 40 during the injection molding process. The retaining structure 24 can also be configured to retain the positioning of or provide a preload force on the core pin 50 during the injection molding process. For example, in an embodiment, the retaining structure 24 can include a top half and a bottom half, in which at least the bottom half is connected to or otherwise positioned in the bottom half 20 of the molding apparatus 10, for example, in a cavity or opening that can be secured to the bottom half 20 using inserts, screws, pins, or the like. The top half and bottom half of the retaining structure 24 can be joined together using screws, bolts, latches, or other fastening devices for engaging the same. As such, when the top half and the bottom half of the retaining structure 24 are fastened or attached together, inner surfaces of the retaining structure 24 clamp and/or retain the tubular structure 40 to provides a force in the Z-direction and/or the containment direction for maintaining the positioning of the tubular structure 40. The retaining structure 24 can also include an inclined portion 25 on the top half for engaging the abutment structure 34 of the top half 30 of the molding apparatus 10 and a spring 220 provided in the bottom half of the retaining structure 24 that abuts against the bottom half 20 of the molding structure 10. It is appreciated that the inclined portion 25 of the retaining structure has a surface that is inclined between 5 and 80 degrees, and preferably between 10 and 40 degrees, with respect to a plane perpendicular to the retaining structure. The inclination angle of the inclined portion 25 of the retaining structure 24 can be dependent on a predetermined amount of force necessary to apply to the core pin during the injection molding process to maintain the positioning of the core pin to counterbalance the molding pressure exerted by the pressurized liquefied polymeric material.

In an embodiment, a core pin 50 having a main body or mandrel 211 and a flexible portion 212 connected to the main body 211 can be used with the molding apparatus 10. The main body 211 of the core pin 50 can have a tapered structure, for example, one end of the main body 211 has a diameter that is larger than the diameter of the remaining portion of the main body 211. The main body 211 with the tapered structure can include an indication or demarcation to assist in positioning of the main body 211 in the tubular structure 40 such that a majority of the main body 211 is inserted into the tubular structure 40 and a portion of the main body 211 extends at least partially out of the tubular structure 40. The indication or demarcation can correspond to the portion of the main body 211 that has a larger diameter than the remainder of the main body to create a fluid-tight seal between the main body 211 of the core pin 50 and the hollow portion of the tubular structure 40. In an embodiment, the flexible portion 212 also extends out of the tubular structure 40 in which a majority of the main body 211 is positioned or oriented within the tubular structure 40.

Figure 3:
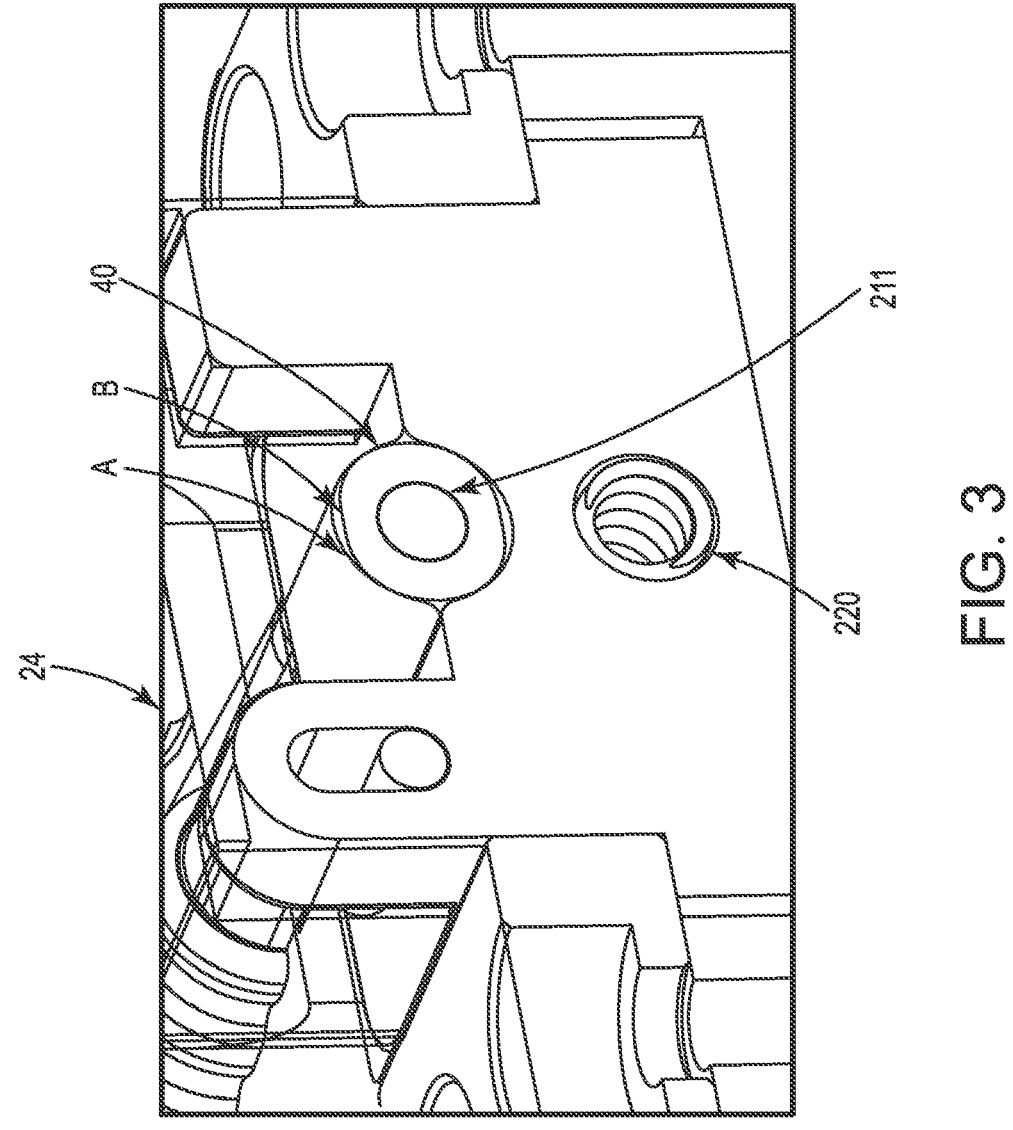
FIG. 3 is a cross-sectional view of the retaining structure of the specialty molding tooling in FIG. 2 along line 3-3.

It is appreciated that in an embodiment, the taper of the main body 211 is provided such that the portion of the main body 211 having the smaller diameter is positioned at least partially within an undercut region of the retaining structure 24, in which the undercut region has an inner surface having a different geometry than the remainder of the retaining structure 24 such that the tubular structure 40 is at least partially deformed in the undercut region. For example, as seen in FIG. 3, tubular structure 40 has an outer surface that has an initial geometry A that is substantially circular. However, as the undercut region of the retaining structure 24 is closed, the tubular structure 40 is at least partially deformed to have a different outer surface geometry B, e.g., flattened, which is different from the geometry of the outer surface of the tubular structure not positioned in the retaining structure 24, which increases the frictional engagement between the retaining structure 24, the tubular structure 40, and the main body 211 of the core pin 50. As such, not only does the undercut region of the retaining structure 24 hold the tubular structure to prevent blowback of the tubular structure from the mold pressure during the injection molding process by providing an interference fit, the retaining and deforming of the tubular structure 40 provides a sealing effect that prevents the liquefied material from the injected thermoplastic material from entering the retaining structure 24. In an embodiment, the taper of the main body 211 of the core pin 50 can also be provided such that the portion of the main body 211 having the larger diameter is positioned in an area between the retaining structure 24 and the mold cavity to further provide a sealing effect to prevent the liquefied material from entering the retaining structure 24.

In order to further facilitate the sealing of the retaining structure 24 from the liquefied material, the geometry of the inner surface of the retaining structure 24 at one end of the tubular structure 40 can be different than a geometry of a molding surface of the mold cavity 22 adjacent to the retaining structure 24, e.g., a transition portion between the retaining structure 24 and the mold cavity 22/32 for forming the overmolded component. For example, the inner surface of the retaining structure 24 can be more ovular, whereas, the molding surface is more circular. As such, when the top half 30 is joined with the bottom half 20 of the molding apparatus, the tubular structure 40 has different outer surface geometries between the mold cavity 22 and the retaining structure 24 such that liquefied material is further sealed within the mold cavity of the molding apparatus 10.

The main body 211 can be made from stainless steel, copper, titanium, nickel, aluminum, tungsten carbide, nitride steel, flexible Nitinol, alloys thereof, and combinations thereof. It is appreciated that the main body 211 can include a coating, surface texturing, or the like to assist in the positioning and guiding of the main body 211 in the tubular structure 40.

The flexible portion 212 can be a wire, a flexible tubing, or cable made from a hard plastic, steel, stainless steel, aluminum, alloys thereof, a plurality of steel cords or wires, or the like. The flexible portion 212 can include a bulleted end for inserting into the tubular structure and/or to assist in removing or extracting the core pin 50 from the tubular structure 40. It is appreciated that since the core pin 50 includes at least the flexible portion 212, an improvement of prior designs of injection molding dies/devices is provided since the length of the core pin can be managed such that the size and/or foot print occupied by the injection molding die/device can be reduced and the length of the core pin can be adjustable to allow the overmolding of a variety of lengths of tubular structures. That is, in the prior designs of the injection molding dies/devices, a variety of steel core pins or mandrels that had varying lengths, e.g., 6 inches, 1 foot, and up to 3 feet, were provided for the overmolding of various lengths of tubular structures. Since the core pins or mandrels made of solid metal portions were inserted into the tubular structures and braced so that the core pin or mandrel would not be displaced from the tubular structure during the injection molding process, one end of the core pin or mandrel extended out of the tubular structure and the injection molding apparatus. The lengths of the solid metal core pins or mandrels not only created an increased footprint size for the molding apparatus, but also resulted in a complicated process to manage the use of the core pins or mandrels with the tubular structures.

On the other hand, in an embodiment, since the core pin 50 of the present disclosure includes a flexible portion 212, the core pin can be used with a potentially infinite length of a tubular structure, e.g., dependent on the length of the flexible portion, since only the main body of the core pin 50 is clamped and positioned in or near the mold cavity and subjected to the molding pressure during the injection molding process. Additionally, since the flexible portion 212 is used for the insertion into the tubular structure and positioning of the main body 211 of the core pin 50, the core pin 50 is easier to install and manage than the prior solid steel mandrels. Furthermore, the flexible portion 212 is able to be wound or otherwise positioned using a retaining system such that the flexible portion 212 does not interfere with the molding die/device during the injection molding process, e.g., wound around a spool or clamped or clipped at a side of the molding apparatus, to provide a more compact molding apparatus in which the press size footprint can be minimized, e.g., a smaller molding apparatus.

Referring to FIGS. 1 thru 4, an embodiment of a method for overmolding a tubular structure using the specialty tooling molding apparatus 10 is discussed below. While the FIGS. illustrate the completed tubular structure and overmolded component forming the fluid connector to more easily understand the disclosure, the description below is directed to the method for forming the overmolded component in general. Additionally, since the left side and right side of the molding apparatus 10 are similar in structure and function, the description with respect to one side is provided herein. The injection molding process can also be used for overmolding a tubular structure for a variety of products without deviating from the scope of this disclosure.

Initially, the tubular structure 40 is prepared by inserting the core pin 50 into the tubular structure 40. For example, the flexible portion 212 can be inserted into the tubular structure and pulled through the tubular structure 40 such that the main body 211 of the core pin 50 is engaged within the hollow portion of the tubular structure 40. As such, as the flexible portion 212 of the core pin 50 is pulled through the tubular structure 40, the tubular structure 40 engages the main body 211 until one end of the tubular structure 40 is positioned at or aligned, for example, near the indication or demarcation on the main body 211.

After the core pin 50 has been inserted into the tubular structure 40, the combined tubular structure 40 and core pin 50 is positioned in the bottom half mold cavity 22. The retaining structure 24 is then closed to clamp at least a portion of the main body 211 of the core pin 50 and the tubular structure 40 by providing a force in at least the Z-direction and/or the containment direction to clamp and/or retain the tubular structure 40 within the bottom half 20 of the molding apparatus 10. For example, the closing of the retaining structure 24 provides an interference fit to maintain the positioning of the tubular structure, as discussed above, e.g., the tubular structure is deformed to increase the frictional engagement between the retaining structure 24 and the tubular structure 40 and core pin 50.

Figure 4:
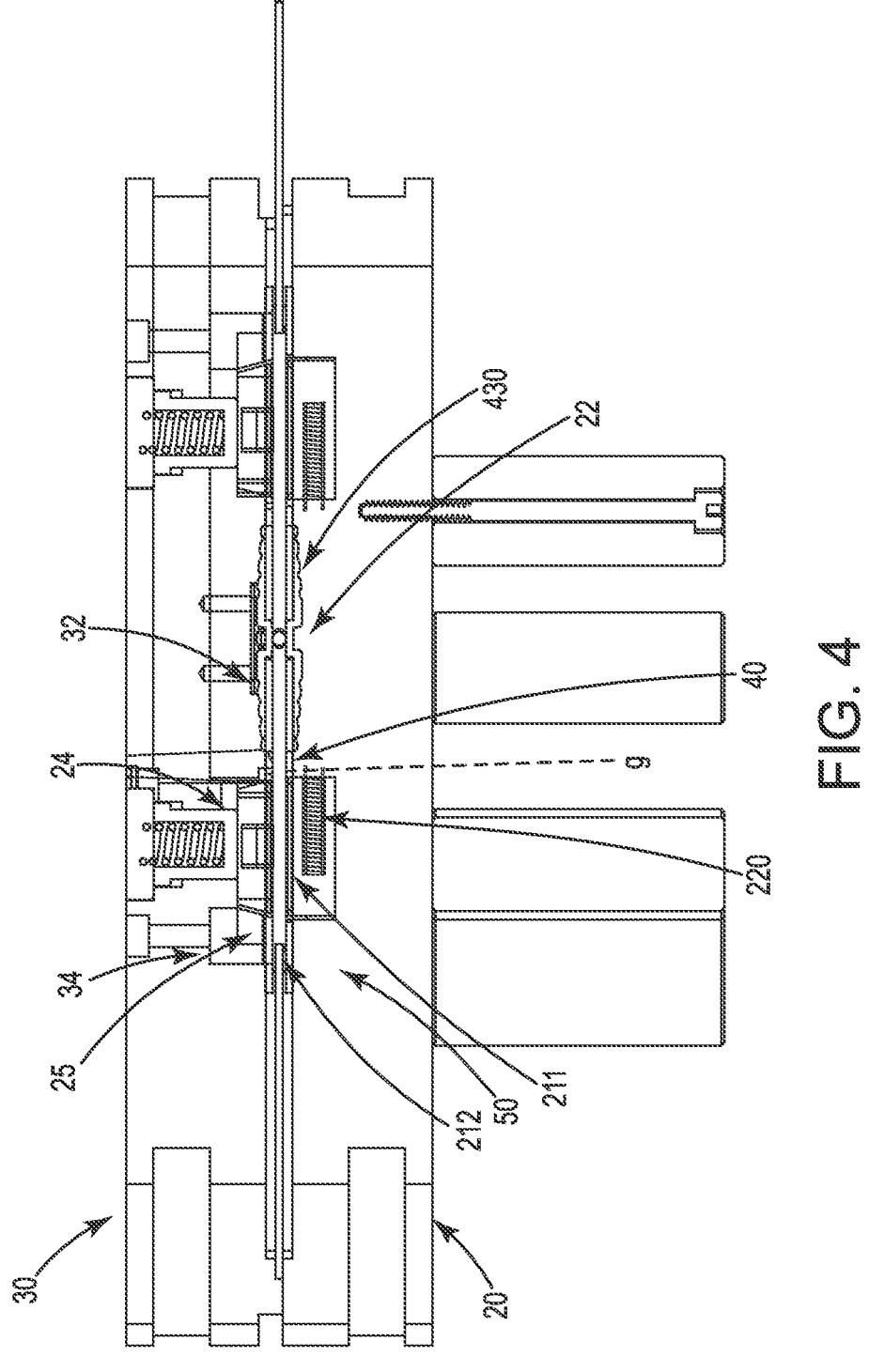
FIG. 4 is a cross-sectional view of the specialty molding tooling in FIG. 1 when the top half and the bottom half of the molding apparatus are connected.

In a further step, as illustrated in FIG. 4, the top half 30 is joined with the bottom half of the molding apparatus 10 to create a sealed mold cavity for the overmolding of the tubular structure 40 and core pin 50 with the predetermined shape. For example, in an embodiment, a thermoplastic material is fed and injected into the sealed mold cavity such that the thermoplastic material contacts at least a portion of the core pin that is extended from the tubular structure and the outer surface of the tubular structure in the sealed mold cavity so that the overmolded component includes a hollow portion that is fluidly connected with the tubular structure. The thermoplastic material can be fed from a hopper and melted and supplied at a molding pressure between 5,000 and 50,000 PSIG, and preferably around 10,000 PSIG. The thermoplastic material can be chosen from a variety of thermoplastic polymers and/or thermoset elastomers so that the tubular structure and overmolded portion are flexible. For example, the tubular structure and overmolded portion can be formed from thermoplastic polymer selected from the group consisting of fluoropolymers, polyurethanes, vulcanizate, flexible polyvinyl chloride (PVC), thermoplastic elastomer (TPE), high-density polyethylene (HDPE), ethylene-vinyl acetate (EVA), co-polymer/polyolefin, high-impact polystyrene (HIPS), polypropylene (PP), acrylonitrile butadiene styrene (ABS), polytetrafluoroethylene (PTFE, or ETFE), or blend of the same, or a thermoset elastomer, such as liquid silicone rubber (LSR) or blend of the same. Thus, the tubular structure and overmolded component can be made from a material that remains flexible even at cryogenic temperatures, e.g., $-196°$ C. The tubular structure and connector can be made from the same material or a different material, but are made generally from material that are materially compatible, e.g., the tubular structure and overmolded component have similar or the same coefficients of thermal expansion/contraction, similar melting temperatures and flow characteristics, the same chemical resistance or compatibility, and/or other properties required by an application for a fluid connection assembly, such as UV blocking and the like. The tubular structure and overmolded component can also be made of material that is relatively inert, e.g., does not leach or significantly absorb a pharmaceutical or biological fluid, and/or non-reactive.

After the overmolded component or portion 430 has been formed continuously with the tubular structure 40 and solidified, the top half 30 of the molding apparatus 10 can be separated from the bottom half 20, and the tubular structure 40 and overmolded portion 430 can be removed from the retaining structure 24 and mold cavity. The core pin 50 can then be removed and/or extracted from the tubular structure 40 by engaging the flexible portion 212 of the core pin 50 and providing a force in an X-direction away from the overmolded portion 430. The tubular structure having the overmolded portion can be engaged, e.g., using a retaining device that clamps around the overmolded portion 430, to provide a force in an opposite direction of the force provided to the flexible portion 212. In an embodiment, a device or tool having a slit and/or opening can be used to engage the bulleted end of the flexible portion 212 for engagement of the same to assist in the removal of the core pin 50 from the tubular structure 40.

In another embodiment, an additional step of creating a preload force on the tubular structure and core pin is provided. For example, the molding apparatus of FIGS. 1 thru 4 can be used to manufacture a fluid connection assembly having a plurality of tubes or tubular structures and overmolded connectors connecting the plurality of tubes or tubular structures. For example, the method includes overmolding a polymeric connector onto two or more polymeric tubular structures each having an internal core pin by preloading a force onto the two or more tubular structures to secure the internal core pins from moving therein in a first mold cavity while joining a second mold cavity and injection molding to form the overmolded connector.

For example, similar to the method described above, initially a first tubular structure is prepared by inserting a first core pin 50 having a first main body or mandrel 211 and a first flexible portion 212 into the first tubular structure 40. The first flexible portion 212 is inserted into the first tubular structure 40 and pulled through the first tubular structure 40 such that the first main body 211 of the first core pin 50 is engaged within the hollow portion of the first tubular structure 40. As the first flexible portion 212 of the first core pin 50 is pulled through the first tubular structure 40, the first tubular structure 40 engages the first main body 211 until one end of the first tubular structure 40 is positioned at or aligned near the indication or demarcation on the first main body 211. The first flexible portion 212 also extends out of the first tubular structure 40 in which a majority of the first main body 211 is positioned or oriented within the first tubular structure 40.

Similarly, a second tubular structure 40 is prepared by inserting a second core pin 60 having a second main body and a second flexible portion into the second tubular structure 40 so that at least a portion of a second main body of the second core pin 60 extends at least partially out of the second tubular structure 40. The second main body with the tapered structure can also include an indication or demarcation to assist in positioning of the second main body in the second tubular structure 40 such that a majority of the second main body is inserted into the second tubular structure 40 and a portion of the second main body extends at least partially out of the second tubular structure 40. In an embodiment, the second flexible portion also extends out of the second tubular structure 40 in which a majority of the second main body is positioned or oriented within the second tubular structure 40. It is also appreciated that in an embodiment, the second core pin can connect two tubular structures 40 by having the second main body extend to connect both tubular structures 40.

The combined first core pin 50 and the first tubular structure 40 and the combined second core pin 60 and the second tubular structure 40 can then be positioned in the bottom mold cavity 22 so that one end of the first core pin 50 in the first tubular structure 40 abuts the second core pin 60 in the second tubular structure 40 to form an intersection or abutment between the core pins at a center portion of the mold cavity. For example, in an embodiment, the one end of the first core pin 50 has a geometry that corresponds to the outer surface geometry of the second core pin 60, e.g., has a crescent shaped end that is able to engage and positionally align the first core pin 50 with the cylindrical outer surface of the second core pin 60. That is, the second core pin 60 can include a main body that traverses the entirety of the mold cavity and connects the two tubular structures 40 to provide a contact point, e.g., outer surface of the main body of the core pin, to create a junction or intersection in which the one end of the first core pin 50 is joined with the second core pin 60. It is appreciated that the end of the first core pin can have other geometries or shapes, e.g., butted or block end, C-shaped, pin, starred, or the like, that engages a corresponding geometry or shape on the second core pin 60 to positionally align the first core pin 50 and the second core pin 60.

As seen in FIG. 2, the first tubular structure 40 and the first core pin 50 can then be clamped to the bottom half 20 of the molding apparatus 10 by the closing of the retaining structure 24. It is appreciated that the clamping of the first tubular structure and the first core pin also creates an increased engagement between the first core pin and the first tubular structure by providing a force in at least the Z-direction and/or the containment direction to clamp and/or retain the first tubular structure 40 within the bottom half 20 of the molding apparatus 10, e.g., provides an interference fit to at least maintain the positioning of the first tubular structure and the first core pin.

In an embodiment, the first main body 211 can be tapered such that the portion of the first main body 211 having the smaller diameter is positioned at least partially within an undercut region of the retaining structure 24, in which the undercut region can have an inner surface having a different geometry than the remainder of the retaining structure such that the first tubular structure 40 is at least partially deformed in the undercut region. As such, not only does the undercut region of the retaining structure 24 hold the first tubular structure 40 to prevent blowback of the first tubular structure 40 against the molding pressure during the injection molding process by providing an interference fit, the retaining and deforming of the first tubular structure 40 provides a sealing effect that prevents the liquefied material from entering the retaining structure 24 during the injection molding process. In an embodiment, the taper of the first main body 211 of the first core pin 50 can also be provided such that the first main body 211 having the larger diameter is positioned in an area between the retaining structure 24 and the mold cavity to further provide a sealing effect to prevent the liquefied material from entering the retaining structure 24.

In order to further facilitate the sealing of the retaining structure 24 from the liquefied material, the geometry of the inner surface of the retaining structure 24 at one end of the first tubular structure 40 can be different than a geometry of a molding surface of the mold cavity 22 adjacent to the retaining structure 24, e.g., a transition portion between the retaining structure 24 and the mold cavity 22/32 for forming the overmolded component. As such, when the top half 30 is joined with the bottom half 20 of the molding apparatus, the first tubular structure 40 has different outer surface geometries between the mold cavity 22 and the retaining structure 24 such that liquefied material is further sealed within the mold cavity of the molding apparatus 10.

In a further step, as illustrated in FIG. 4, the top half 30 is joined with the bottom half of the molding apparatus 10 to create a sealed mold cavity for the overmolding of the first tubular structure and a second tubular structure with the predetermined shape, e.g., a connector. In an embodiment, the top half 30 includes the clamping portion 36 for clamping and retaining the second tubular structure 40 at least in the Z-direction and/or the containment direction in the molding apparatus. The clamping portion 36 can have the same or similar features as the retaining structure 24 for clamping and/or retaining the second tubular structure, e.g., an undercut region or deforming portion, and to prevent the liquefied material from the injected thermoplastic material from entering the clamping portion 36, e.g., having different inner surface geometries than the mold cavity and/or another portion of the clamping portion 36.

Figure 5:
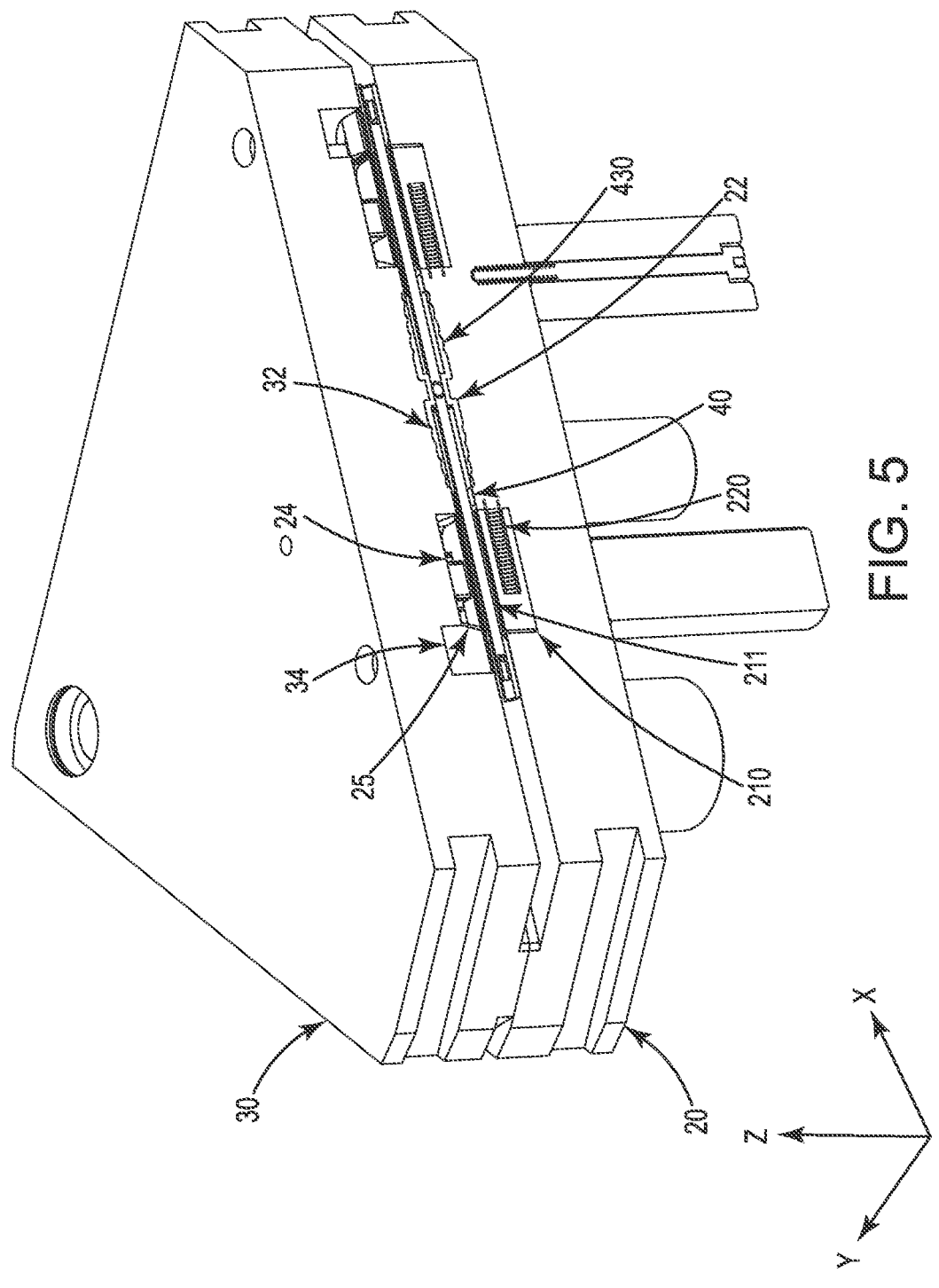
FIG. 5 is a cross-sectional view of a perspective view of the specialty molding tooling in FIG. 1, in which the top half and the bottom half of the molding apparatus are connected.
Figure 6:
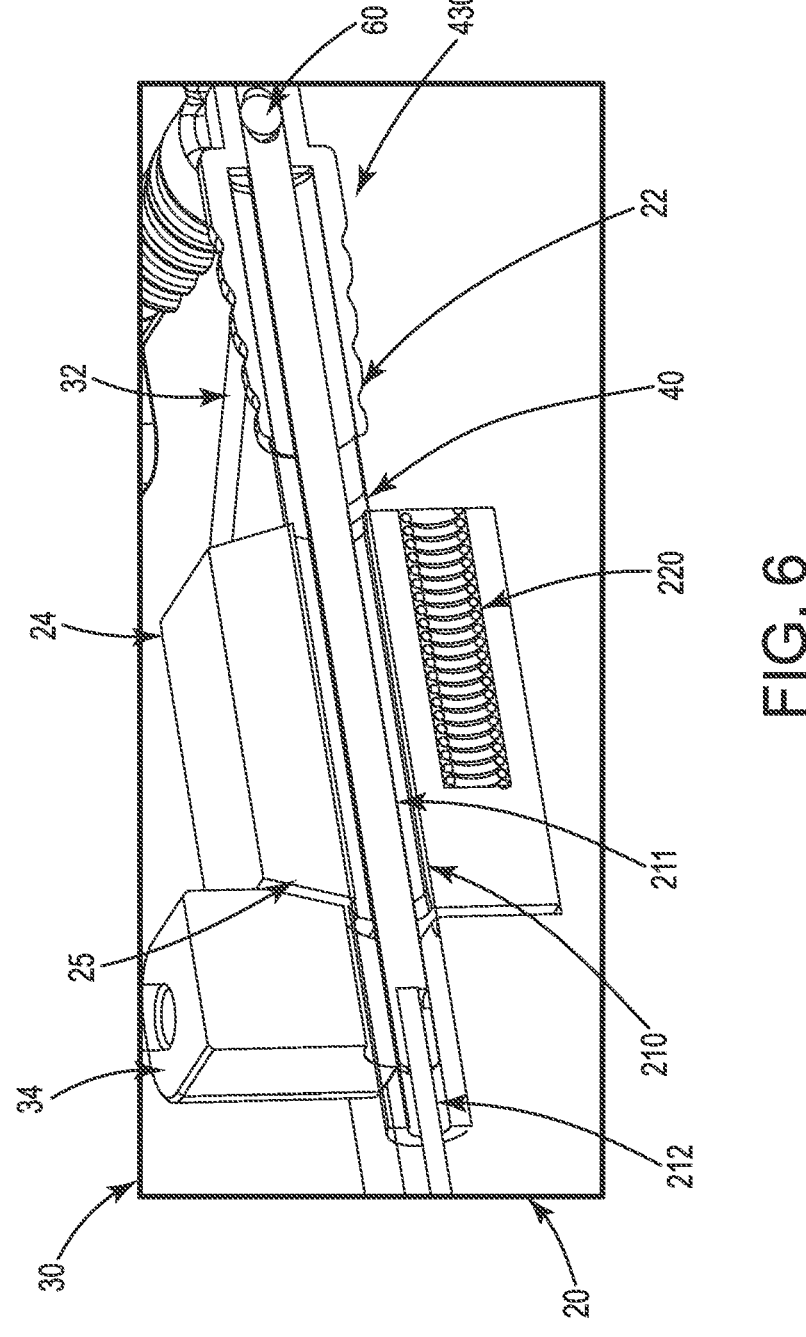
FIG. 6 is a magnified cross-sectional view of the specialty molding tooling in FIG. 1 in which the top half and the bottom half of the molding apparatus are connected.

As the top half 30 is joined with the bottom half 20 of the molding apparatus 10, the abutting structure 34 of the top half 30 engages with the inclined surface 25 of the retaining structure 24 in the bottom half 20 such that a preloading force in the X-direction is created on the first core pin 50 towards the second core pin 60. For example, as seen in FIG. 2, a gap "g" is provided between the retaining structure 24 and the mold cavity 22 of the molding apparatus 10 and, as seen in FIGS. 5 and 6, the retaining structure includes a bolt 220 provided in a cavity in the bottom half of the retaining structure that abuts the bottom half 20 of the mold cavity 22. When the spring 220 in the relaxed state, the spring 220 maintains the clearance or distance of the gap "g." As the top half 30 is joined with the bottom half 20 of the molding apparatus 10, as seen in FIGS. 4, 5, and 6, the abutting structure 34 engages with the inclined portion 25 of the retaining structure 24 so that the retaining structure 24 is moved or slid in the X-direction and the spring 240 is compressed. The total predetermined preloaded force is provided when the spring is fully compressed, e.g., when the gap "g" is decreased to near or at zero, e.g., close or little separation between the molding apparatus and the retaining structure. The initial gap distance "g" is provided at a distance between 0.001 inches and 0.10 inches and preferably about 0.03 inches such that the retaining structure 24 can be moved or slid towards the mold cavity to create the necessary amount of preload force. As such, since the retaining structure 24 clamps or retains the first tubular structure 40 along with the first core pin 50, the first core pin 50 in the first tubular structure is subjected to a preload force. Thus, the first core pin 50 is maintained and/or abutted against the second core pin 60 at the intersection between the first core pin 50 and the second core pin 60 in the mold cavity even when subjected to the molding pressure during the injection molding process. The gap "g" can also be provided such that a forward timing of the retaining structure 24 is created during the joining of the top half 30 and the bottom half 20 of the molding apparatus 10, e.g., as the top half 30 is joined with the bottom 20, an incremental increase of the preload force is provided between the first core pin 50 and the second core pin 60 until the total preload force is provided. It is appreciated that in an embodiment, the top half 30 of the molding apparatus 10 can include a spring and compression device to prevent the vertical movement of the retaining structure 24 during the joining of the top half 30 and the bottom half 20 of the molding apparatus 10. It is also appreciated that the gap "g" and the inclination angle of the inclined portion 25 of the retaining structure 24 can be adjusted together to provide the predetermined amount of force necessary (or incremental amount of force) to apply to the core pin to maintain the positioning of the core pin to counterbalance the molding pressure force exerted by the pressurized liquefied polymeric material during injection molding. That is, the retaining structure 24 can be designed and replaced with the appropriate inclination angle of the inclined portion and gap "g" depending on the amount of predetermined force necessary to counter balance the molding pressure, the material of the tubular structure, material of the injected polymeric material, or the like.

Then the thermoplastic material is fed and injected into the mold cavity formed from the bottom mold cavity 22 and the top mold cavity 32 such that the thermoplastic material contacts at least a portion of the first core pin that is extended from the first tubular structure and the second core pin extended from the second tubular structure to overmold the core pins and the tubular structures to form a connector that fluidly connects the first tubular structure and the second tubular structure. The thermoplastic material can be fed from a hopper and melted and supplied at a pressure between 5,000 and 50,000 PSIG, and preferably around 10,000 PSIG. The thermoplastic material can be chosen from a variety of thermoplastic polymers and/or thermoset elastomers so that the tubular structures and overmolded portion are flexible. For example, the tubular structures and overmolded portion can be formed from thermoplastic polymer selected from the group consisting of fluoropolymers, polyurethanes, vulcanizate, flexible polyvinyl chloride (PVC), thermoplastic elastomer (TPE), high-density polyethylene (HDPE), ethylene-vinyl acetate (EVA), co-polymer/polyolefin, high-impact polystyrene (HIPS), polypropylene (PP), acrylonitrile butadiene styrene (ABS), polytetrafluoroethylene (PTFE, or ETFE), or blend of the same, or a thermoset elastomer, such as liquid silicone rubber (LSR) or blend of the same. Thus, the tubular structures and overmolded portion are made from a material that remains flexible even at cryogenic temperatures, e.g., −196° C. The tube and connector can be made from the same material or a different material, but are made generally from material that are materially compatible, e.g., the tubular structures and overmolded portion have similar or the same coefficients of thermal expansion/contraction, similar melting temperatures and flow characteristics, the same chemical resistance or compatibility, and/or other properties required by an application for a fluid connection assembly, such as UV blocking and the like. The tubular structures and overmolded portion can also be made of material that is relatively inert, e.g., does not leach or significantly absorb the pharmaceutical or biological fluid, and non-reactive.

After the overmolded portion 430 has been formed continuously with the tubular structures 40 and solidified, the top half 30 of the molding apparatus 10 can be separated from the bottom half 20, and the tubular structures 40 and overmolded portion 430 can be removed from the retaining structure 24 and the molding apparatus 10. As the top half 30 is separated from the bottom half, the spring 220 returns the retaining structure 24 to a neutral or initial position to allow providing a subsequent preloading force on a subsequent core pin for subsequent overmolding operations. The first core pin 50 can then be removed and/or extracted from the first tubular structure 40 by engaging the flexible portion 212 of the first core pin 50 and providing a force in an X-direction away from the overmolded portion 430. The second core pin 60 can then be removed and/or extracted from the second tubular structure by engaging the flexible portion 212 of the second core pin 60, as discussed in the above embodiments.

The specialty tooling for overmolding can then be used for subsequent overmolding operations, for example, forming a spine assembly for a fluid connection assembly. Specifically, the specialty tooling and overmolding method allows the forming of the connector on a tubular structure in a one-step molding operation so that after the at least one tubular structure is overmolded with the connector, additional tubular structures can be positioned and subsequently overmolded via the above steps. By having such features, a repeated structure that is free of inclusions, occlusions or interruptions can be formed so that a continuous flow path is provided internally of the tubular structure(s) and the overmolded connector(s) that do not have the defects of the prior art injection molding processes.

As such, a specialty tooling apparatus and method for overmolding a tubular structure is provided which has a number of benefits over the prior injection molding processes. For example, in an embodiment, a specific slide carrier method is provided that creates a preloaded force against the core pins and/or is able to maintain the positioning of the tubular structure that avoids substantial deformation of the tubular structure. That is, the core pins at the intersection/junction between the core pins are preloaded with a force in the X-direction, so that the core pins are held and positioned such that, during the injection molding process, flashing, e.g., intrusion of thermoplastic material into the tubular structure is reduced and/or prevented by preventing the separation of the core pins. Thus, inclusions, occlusions, or interruptions in the flow path of the connector and tubular structures are mitigated or eliminated so that a continuous flow path is provided internally of the tubular structure and the overmolded connector.

In other words, the methods described herein for forming the overmolded components over the tubular structure using the methods and/or molding apparatus, as described herein, at least has the benefit of forming an overmolded component that has a flow path that is free of occlusions, inclusions, and/or interruptions between the overmolded component and tubular structure(s), e.g., has little to no defects in the molded component that can lead to failure, for example, leakages, breakages, or rupture. Thus, the method of forming the overmolded component over the tubular structure avoids the creation of pockets that can accumulate fluid and lead to contamination and the breakage of cells, e.g., the internal flow path is smooth, or failure while maintaining a sufficient pull out force. Furthermore, it was surprisingly found, in some embodiments, that since the connector and tubular structure are continuously formed, if the connector and the tubular structure are made of the same or similar material, e.g., have the same or similar thermal properties, the fluid connection assembly formed from the same can be used in cryogenic processes while maintaining the structural integrity of the system, e.g., leakage and/or contamination is prevented. For example, the connector is able to withstand an impact test at −196° C., freeze-drop test at −195° C., and be used for freeze-thaw applications.

It is appreciated that while the above description has been discussed with respect to the retaining structure 24 for clamping the first tubular structure, it is appreciated that various modifications of the retaining structure can be used in which the retaining structure 24 can be provided for clamping portions of the tubular structure and/or core pin that require the movement of the retaining structure 24 to provide a preloading force, e.g., a core pin that engages the outer surface or end of another core pin.

Figure 7:
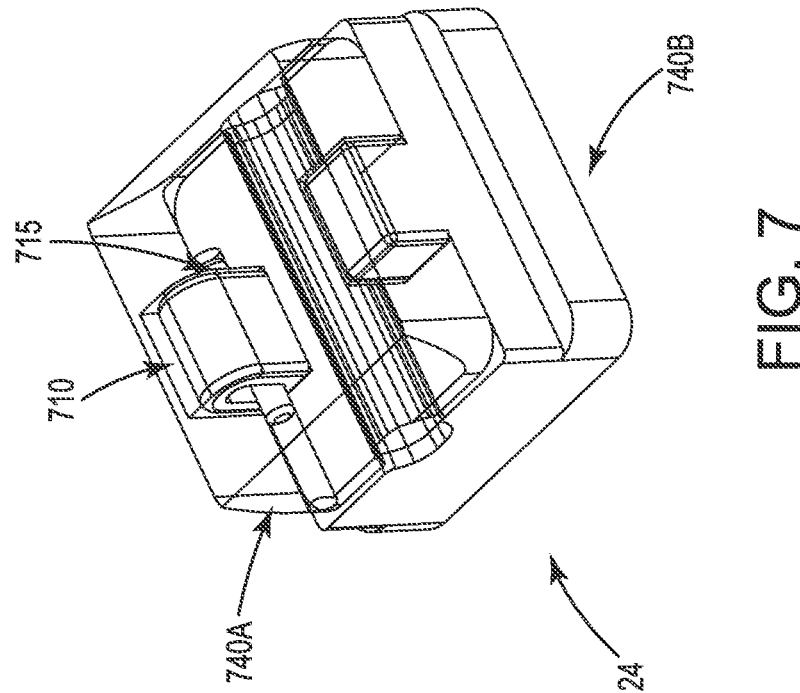
FIG. 7 is a perspective view of an embodiment of the retaining structure of the specialty molding tooling in FIG. 1.

As seen in FIG. 7, in an embodiment, the retaining structure 24 can include a clam-shaped or hinged design. The retaining structure 24 includes a hinge 710 and pivot pit 715 connected to the hinge 710 that allows the top half 740A of the retaining structure 24 to open to allow the insertion of the tubular structure 40 and close with the bottom half 740B to clamp or retain the tubular structure 40. The top half 740A can be coupled to the bottom half 740B using a mechanical locking system, for example, a lever latch, pins, screws, or similar mechanical latching device that allows the latching and release of the top half 740A from the bottom half 740B.

Figure 8:
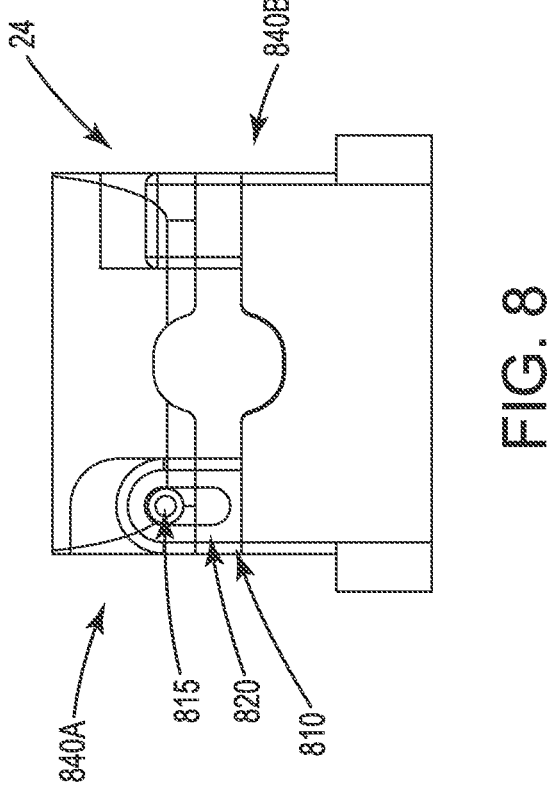
FIG. 8 is an end view of the embodiment of the retaining structure of the specialty molding tooling in FIG. 7.

In an embodiment, as illustrated in FIG. 8, the hinge 810 includes a slot 820 that allows the raising and lowering of the top half 840A with respect to the bottom half 840B. For example, the pivot pin 815 is able to be raised and lowered in the slot 820 which allows the top half 840A to be raised to accommodate the tubular structure 40 between the top half 840A and the bottom half 840B. The top half 840A and pivot pin 815 can then be lowered to clamp and/or retain the tubular structure 40 in the retaining structure 24. It is appreciated that the accommodation space between the top half 840A and the bottom half 840B can have inner surfaces that have different shapes for clamping and/or retaining the tubular structure 40. For example, in an embodiment, the accommodation space has a non-circular profile, e.g., a roundness between 0.9 to 0.99 and/or circularity between 0.95 to 1.1, such that when the top half 840A is in the clamping position with the bottom half 840B, the tubular structure is deformed, at least partially, so that the tubular structure has a different outer surface geometry than an initial outer surface geometry of the tubular structure, e.g., flattened, to seal the clamped portion of the tubular structure from the injected thermoplastic material. In a preferred embodiment, the accommodation space has a geometry that is rounded at the top half 840A and the bottom half 840B of the retaining structure 24. However, the accommodation space can have other surface geometries that allow the deforming of the tubular structure 40 for clamping the tubular structure 40 to the molding apparatus 10 without damaging the outer surface of the tubular structure 40. It is appreciated that in any of the embodiments, the geometry of the inner surface of the retaining structure 24 can be dependent on a number of factors, such as, malleability of the tubular structure, the pressure of the injection molding device, the amount of predetermined force necessary for the core pin, or the like.

Figure 9:
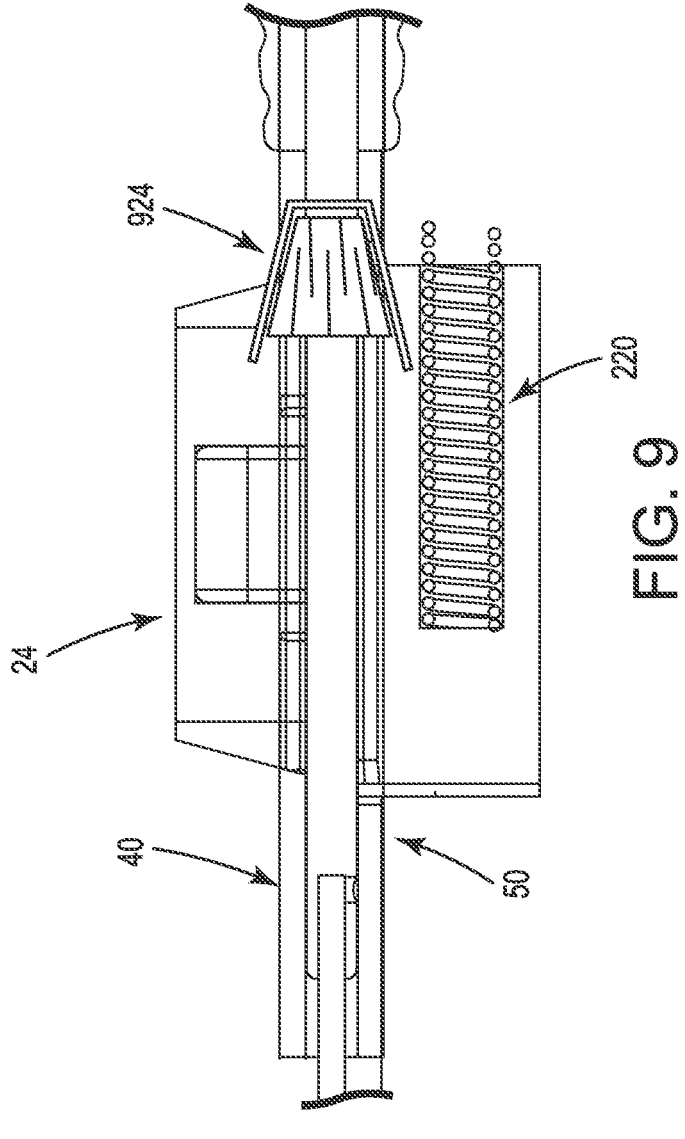
FIG. 9 is a cross-sectional view of another embodiment of the retaining structure of the specialty molding tooling in FIG. 1.

In another embodiment, as seen in FIG. 9, the retaining structure 24 includes a collet 924 that is provided around the tubular structure 40 after the core pin 50 has been installed. The collet 924 is a compressible collar made from a hard plastic or steel. The collet 924 can be provided against an outer end of the retaining structure 24 or within an internal cavity of the retaining structure 24. As such, as the retaining structure 24 is moved or slid in the X-direction, the collet 24 is compressed to engage the tubular structure 40 and the core pin 50. Thus, when the retaining structure 24 is engaged by the abutment structure of the top half of the molding apparatus 10, the retaining structure 24 is slid or moved towards the molding apparatus compressing the spring 240, and the collet 924 is compressed and slid to provide a preload force on the core pin 50 so that the one end of the core pin 50 maintains its engagement with the second core pin at the intersection in the mold cavity during the injection molding process.

In an embodiment, the retaining structure 24 can include additional structures or components to increase the frictional contact between the retaining structure and the tubular structures. For example, a film can be applied to the clamping portion of the retaining structure 24, such as silicone or rubber, or a rigid plastic material can be provided between the clamping portion and the tubular structure.

Furthermore, as discussed above, it is appreciated that since the core pin includes a flexible portion, the core pin can be used to accommodate a variety of lengths for overmolding the tubular structure, since the main body is the only portion of the core pin subjected to the clamping and retaining by the molding apparatus during injection molding. As the flexible portion is flexible, e.g., being a wire, a flexible tubing, a cable, or the like, the flexible portion can be moved or wound using a retaining system to decrease the footprint size of the molding apparatus. As such the flexible portion does not interfere with the molding die/device during the injection molding process, e.g., the flexible portion can be wound around a spool or clamped or clipped at a side of the molding apparatus, to provide a more compact molding apparatus in which the press size footprint can be minimized, e.g., a smaller molding apparatus.

Figure 10:
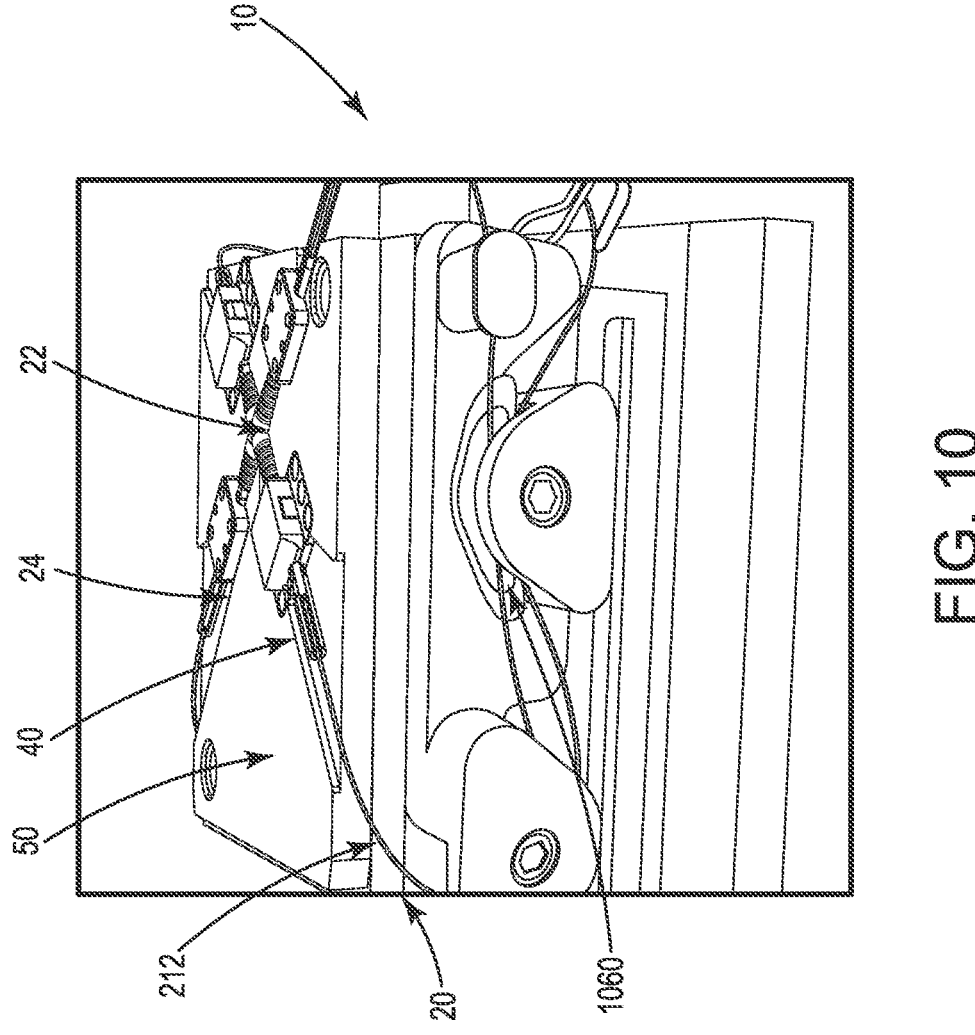
FIG. 10 is a perspective view of another embodiment of a core pin retaining system for the specialty molding tooling in FIG. 1.

For example, in one embodiment, as seen in FIG. 10, the tubular structure 40 having the core pin 50 is placed in the retaining structure 24 and bottom half mold cavity 22 so that the flexible portion 212 of the core pin 50 extends from the molding apparatus 10. The flexible portion 212 can then be guided or otherwise retained in a spool 1060 that is provided on an outer portion of the clamping apparatus 10. As such, the flexible portion 212 of the core pin 50 can be positioned or moved to be stored out of the way to provide a more compact molding apparatus. It is appreciated that other embodiments of the invention, the flexible portion 212 can also be guided or otherwise retained by clamps or retaining rings or the like that are provided on an outer portion of the clamping apparatus 10.

Aspects

Any of aspects 1-12 can be combined with any of aspects 13-17 or vice-versa.

Aspect 1. A method for overmolding a tubular structure comprising inserting a core pin into the tubular structure so that at least a portion of a main body of the core pin extends at least partially out of the tubular structure, wherein the core pin comprises the main body and a flexible portion connected to the main body and the flexible portion extends out of the tubular structure; clamping the tubular structure to a mold cavity structure in an Z-direction and/or a containment direction using a retaining structure, wherein the retaining structure comprises an inclined portion and the flexible portion extends out of the mold cavity structure; and injecting a thermoplastic material into a mold cavity of the mold cavity structure to overmold at least a portion of the tubular structure, wherein the injecting of the thermoplastic material includes the thermoplastic material contacting the portion of the core pin extended from the tubular structure.

Aspect 2. The method according to Aspect 1, wherein the flexible portion of the core pin is a wire, a flexible tubing, or cable.

Aspect 3. The method according to any of Aspects 1-2, wherein the main body of the core pin has a tapered structure and an indication on the main body of the core pin, wherein the inserting of the core pin comprises inserting the flexible portion of the core pin into the tubular structure and aligning one end of the tubular structure with the indication on the main body of the core pin, and/or wherein the main body includes a portion that has a diameter smaller than a diameter of the main body of the core pin, wherein the portion having the smaller diameter corresponds to a portion of the tubular structure in the retaining structure.

Aspect 4. The method according to any of Aspects 1-3, further comprising removing the core pin from the tubular structure by engaging the flexible end of the core pin.

Aspect 5. The method according to any of Aspects 1-4, wherein the clamping of the tubular structure to the mold cavity structure includes deforming, at least partially, the tubular structure so that the tubular structure has a different outer surface geometry than an initial outer surface geometry of the tubular structure to seal the clamped portion of the tubular structure from the injected thermoplastic material.

Aspect 6. The method according to any of Aspects 1-5, wherein an inner surface geometry of the portion of the retaining structure contacting an outer surface of the tubular structure is different than a mold surface geometry of the mold cavity adjacent to the retaining structure.

Aspect 7. The method according to any of Aspects 1-6, further comprising inserting a second core pin into a second tubular structure so that the core pin in the tubular structure abuts the second core pin in the second tubular structure to form an intersection; preloading the clamped tubular structure to provide a preloading force on the clamped tubular structure in a X-direction towards the mold cavity structure by an engagement of the retaining structure during a joining of halves of the mold cavity structure so that the core pin in the tubular structure is preloaded against the second core pin and maintains the abutment of the core pin to the second core pin during the injecting of the thermoplastic material, wherein the engagement of the retaining structure includes joining an abutting structure that includes a complementary structure to the inclined portion of the retaining structure with the retaining structure during the joining of the halves of the mold cavity structure, wherein the injecting the thermoplastic material into the mold cavity further comprises overmolding the tubular structure and second tubular structure to form a connector that fluidly connects the tubular structure and the second tubular structure.

Aspect 8. The method according to Aspect 7, wherein the preloading the clamped tubular structure comprises sliding the retaining structure in the X-direction towards the mold cavity structure.

Aspect 9. The method according to Aspect 8, wherein the sliding of the retaining structure comprises compressing a spring in the retaining structure against the mold cavity structure, so that when the halves of the mold cavity are separated, the spring returns the retaining structure to a neutral position.

Aspect 10. The method according to any of Aspects 7-9, wherein the connector comprises at least two connector portions, wherein each of the at least two connector portions extend from a center of the connector and have a first end connected to the center of the connector and a second end connected to the second open end of one of the plurality of tubes, and wherein each of the at least two connector portions are formed to be conically tapered where an outer diameter of the first end at the center of the connector is larger than an outer diameter of the second end of the connector portion in a way such that the connector portion is flexible.

Aspect 11. The method according to any of Aspects 7-10, wherein the core pin of the tubular structure has a geometry that corresponds to a geometry of an outer surface of the second tubular structure.

Aspect 12. The method according to any of Aspects 7-11, wherein the preloading the core pin in the tubular structure against the second core pin comprises sliding the retaining structure in the X-direction towards the mold cavity structure between 0.001 inches and 0.10 inches and preferably about 0.03 inches.

Aspect 13: A method comprising overmolding a polymeric connector onto two or more polymeric tubular structures each having an internal core pin by preloading a force onto the two or more tubular structures to secure the internal core pins from moving therein in a first mold cavity while joining a second mold cavity and injection molding the connector.

Aspect 14. The method according to Aspect 13, wherein a diameter of the internal core pin receiving the preloading force is smaller than a diameter of a main body of the core pin such that during the injection molding, the internal core pin is not displaced from the other internal core pin, and wherein the preloaded force is provided such that one of the two or more polymeric tubular structures is able to be slid in a X-direction towards the other internal core pin.

Aspect 15. The method according to any of Aspects 13-14, wherein the preloading the force includes clamping the tubular structure to a mold cavity structure in an Z-direction and/or a containment direction using a retaining structure, wherein the retaining structure comprises an incline.

Aspect 16. The method according to Aspect 15, wherein the preloading the force includes preloading the clamped tubular structure to provide a preloading force on the clamped tubular structure in a X-direction towards the mold cavity structure by an engagement of the retaining structure during the joining of the first mold cavity and the second mold cavity.

Aspect 17. The method according to Aspect 16, wherein the preloading the clamped tubular structure comprises sliding the retaining structure in the X-direction towards the first mold cavity and the second mold cavity.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A method for overmolding a tubular structure comprising:

inserting a core pin into the tubular structure so that at least a portion of a main body of the core pin extends at least partially out of the tubular structure, wherein the core pin comprises the main body and a flexible portion connected to the main body and the flexible portion extends out of the tubular structure;

clamping the tubular structure having the core pin inserted to a mold cavity structure in an Z-direction and/or a containment direction using a retaining structure, wherein the retaining structure comprises an inclined portion and the flexible portion extends out of the mold cavity structure; and injecting a thermoplastic material into a mold cavity of the mold cavity structure to overmold at least a portion of the clamped tubular structure, wherein the injecting of the thermoplastic material includes the thermoplastic material contacting the portion of the core pin extended from the tubular structure.

2. The method according to claim 1, wherein the flexible portion of the core pin is a wire, a flexible tubing, or cable.

3. The method according to claim 1, wherein the main body of the core pin has a tapered structure and an indication on the main body of the core pin, wherein the inserting of the core pin comprises inserting the flexible portion of the core pin into the tubular structure and aligning one end of the tubular structure with the indication on the main body of the core pin, and/or wherein the main body includes a portion that has a diameter smaller than a diameter of the main body of the core pin, wherein the portion having the smaller diameter corresponds to a portion of the tubular structure in the retaining structure.

4. The method according to claim 1, further comprising removing the core pin from the tubular structure by engaging the flexible end of the core pin.

5. The method according to claim 1, wherein the clamping of the tubular structure to the mold cavity structure includes deforming, at least partially, the tubular structure so that the tubular structure has a different outer surface geometry than an initial outer surface geometry of the tubular structure to seal the clamped portion of the tubular structure from the injected thermoplastic material.

6. The method according to claim 1, wherein an inner surface geometry of the portion of the retaining structure contacting an outer surface of the tubular structure is different than a molding surface geometry of the mold cavity adjacent to the retaining structure.

7. The method according to claim 1, further comprising:

inserting a second core pin into a second tubular structure so that the core pin in the tubular structure abuts the second core pin in the second tubular structure to form an intersection;

preloading the clamped tubular structure to provide a preloading force on the clamped tubular structure in a X-direction towards the mold cavity structure by an engagement of the retaining structure during a joining of halves of the mold cavity structure so that the core pin in the tubular structure is preloaded against the second core pin and maintains the abutment of the core pin to the second core pin during the injecting of the thermoplastic material, wherein the engagement of the retaining structure includes joining an abutting structure that includes a complementary structure to the inclined portion of the retaining structure with the retaining structure during the joining of the halves of the mold cavity structure, wherein the injecting the thermoplastic material into the mold cavity further comprises overmolding the tubular structure and second tubular structure to form a connector that fluidly connects the tubular structure and the second tubular structure.

8. The method according to claim 7, wherein the preloading the clamped tubular structure comprises sliding the retaining structure in the X-direction towards the mold cavity structure.

9. The method according to claim 8, wherein the sliding of the retaining structure comprises compressing a spring in the retaining structure against the mold cavity structure, so that when the halves of the mold cavity are separated, the spring returns the retaining structure to a neutral position.

10. The method according to claim 7, wherein the connector comprises at least two connector portions, wherein each of the at least two connector portions extend from a center of the connector and have a first end connected to the center of the connector and a second end connected to the second open end of one of the plurality of tubes, and wherein each of the at least two connector portions are formed to be conically tapered where an outer diameter of the first end at the center of the connector is larger than an outer diameter of the second end of the connector portion in a way such that the connector portion is flexible.

11. The method according to claim 7, wherein the core pin of the tubular structure has a geometry that corresponds to a geometry of an outer surface of the second tubular structure.

12. The method according to claim 7, wherein the preloading the core pin in the tubular structure against the second core pin comprises sliding the retaining structure in the X-direction towards the mold cavity structure between 0.001 inches and 0.10 inches.

* * * * *